C. W. STICKLER.
TAIL GATE FOR DUMP CARS.
APPLICATION FILED SEPT. 23, 1913.
1,105,464.
Patented July 28, 1914.
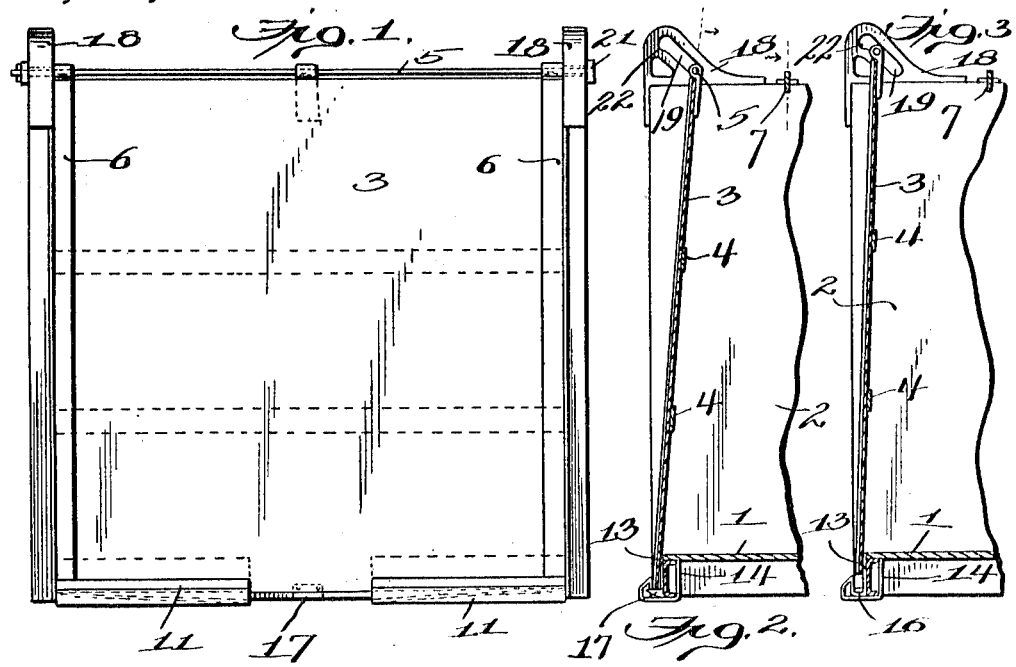
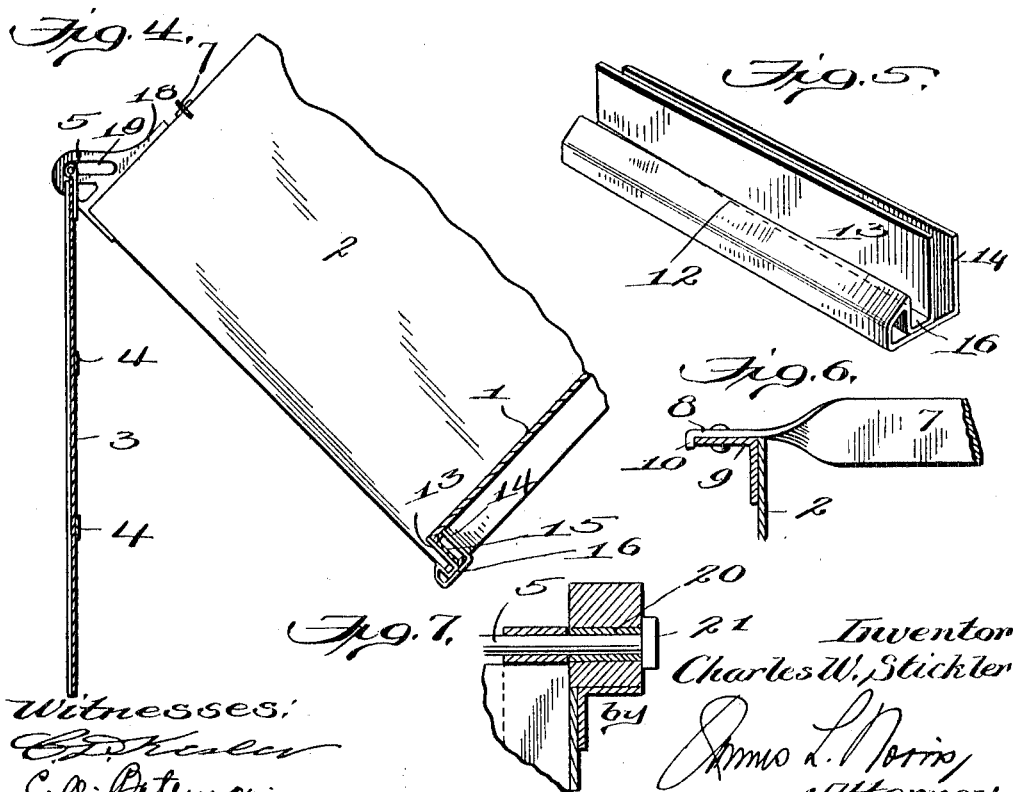

UNITED STATES PATENT OFFICE.

CHARLES W. STICKLER, OF LANSFORD, PENNSYLVANIA.

TAIL-GATE FOR DUMP-CARS.

1,105,464.   Specification of Letters Patent.   Patented July 28, 1914.

Application filed September 23, 1913.   Serial No. 791,349.

*To all whom it may concern:*

Be it known that I, CHARLES W. STICKLER, a citizen of the United States, residing at Lansford, in the county of Carbon and State of Pennsylvania, have invented new and useful Improvements in Tail-Gates for Dump-Cars, of which the following is a specification.

My present invention relates to improvements in tail gates for vehicles having dumping bodies such, for example, as dump cars and dump wagons or carts, and the primary object of the invention is to provide a tail gate which is automatic in its operation, it being released automatically as the body of the car or vehicle is tilted to dump the load and returned to closed position and fastened automatically when the body of the car or vehicle is returned to normal position, the construction being relatively simple and inexpensive and not liable to become damaged.

To these and other ends, the invention consists in certain improvements, and combinations and arrangements of parts, all as will be hereinafter more fully described, the novel features being pointed out particularly in the claims at the end of the specification.

In the accompanying drawings:—Figure 1 represents an end view of the body of a dump car equipped with an automatic tail gate constructed in accordance with the present invention; Figs. 2 and 3 are longitudinal sections of the end of the car body, Fig. 2 showing the tail gate in closed and locked position, and Fig. 3 showing the tail gate as it moves into closed or locked position; Fig. 4 shows the position of the gate when the body of the car is tilted to dump the load; Fig. 5 is a perspective view of one of the catches for fastening the tail gate in closed position; Fig. 6 is a detail view showing one end of the tie bar which connects the sides of the body; Fig. 7 is a detail sectional view showing the manner in which the pivot or hinge pin for the tail gate is mounted with respect to the bracket on the car body.

Similar parts are designated by the same reference characters in the several views.

Automatic tail gates embodying the present invention are applicable generally to vehicles of various types employing a tilting or dumping body. In the present instance the invention is shown as applied to the body of a dump car or similar vehicle, such cars being used commonly in mining, grading and excavating operations. In the present instance the tilting body has a bottom 1 and sides 2. The body may be mounted in any suitable manner upon the truck or running gear in order that it may tilt to dump the load therefrom and normally occupy a horizontal position to receive and carry the load.

The tail gate 3 may be of any suitable construction, that shown having bars 4 to stiffen it, particularly in those cases where the tail gate is made of sheet metal.

The tail gate is provided with a pivot pin or rod 5 which in the present instance is secured to the gate by straps 6, and the pivot pin or rod extends across the end of the body and connects the sides thereof. In order to prevent spreading of the sides of the body, a tie bar 7 may be used, that shown being of flat metal, the intermediate portion of which is arranged vertically in order that it will not interfere with the loading of the material into the body, and each end of the tie bar is twisted to form a horizontal lug 8 which is riveted or otherwise secured to the respective side of the body, the latter in the present instance being provided with an outturned angle iron 9 and the outer end of the lug 8 is downturned to form a shoulder 10 to abut against the angle iron, the tie bar forming a rigid connection between the sides of the body to prevent spreading and to resist the outward pressure on the sides of the body due to the weight of the material therein.

The bottom of the tail gate in the present instance is held in closed position by a pair of catches 11, these catches being arranged toward opposite sides of the car body and at a level below the bottom 1 thereof, a space being left between the inner ends of the catches for the discharge of any material that may lodge upon the catches. Each of these catches is preferably composed of sheet metal doubled to form a beveled ledge 12 which projects upwardly, the ends 13 and 14 of the catch being secured to opposite sides of the cross beam or member 15. The bottom 16 of the catch which is formed adjacent to the ledge 12 preferably slopes in a direction from the outer side of the car toward the center thereof, this appearing from Figs. 1 and 5.

The tail gate preferably has a straight bottom edge and owing to the inwardly sloping arrangement of the bottoms 16 of the catches, the bottom edge of the tail gate will rest upon the bottoms of the catches only toward the sides of the car, the middle portion of the tail gate being above the bottoms of the catches, and this feature prevents packing or caking of material in the bottoms of the catches and the sloping arrangement thereof enables material lodging therein to gravitate to the opening at the center. Clogging of the catches is thereby avoided. In order to support the middle portion of the gate, a step 17 is preferably used which step may be secured conveniently to the cross bar 15. A pair of brackets 18 are provided on the sides of the body and each of these brackets has a slot or groove 19 through which the hinge or pivot rod 5 passes. To minimize friction and wear, a roller 20 is fitted over each end of the pivot rod and operates in the respective slot 19. The ends of the pivot rod have collars or heads 21 to abut against the outer sides of the respective brackets 18, thereby retaining the pivot rod in place. The slots 19 in the brackets are inclined upwardly toward the discharge end of the body and the upper ends of the slots have depressions or recesses 22 in which the rollers on the pivot rod are adapted to rest when the pivot rod reaches the upper ends of the slots. When the pivot rod is in this position, the lower end of the tail gate will be above and clear of the catches, and when the pivot rod is at the bottom of the slots 19, the lower edge of the tail gate will rest on the bottoms of the catches and will be fastened in closed position by the ledges 12 of the catches. When in fastened position, the tail gate will be inclined inwardly toward the top, as shown in Fig. 2.

The operation of the tail gate may be briefly described as follows:—Normally, the body of the car or vehicle will be horizontal and the load may be dumped therein in the usual way, the tail gate being held in closed position by the catches 11. When the body of the car or vehicle is tilted to dump the load, the pressure of the material upon the upper portion of the tail gate will force the latter outwardly or toward a vertical position, and as the gate is forced in this direction, it will be lifted owing to the inclined position of the slots 19 in which the rollers 20 on the pivot pin travel. When the rollers 20 on the pivot pin reach the depressions 22 in these slots, the pivot pin then will be held at the upper ends of the slots and the lower edge of the tail gate will be lifted clear of the ledges 12 of the catches. The tail gate will then swing into open position, permitting the load to be dumped from the body. After the load has been discharged, the body of the car or vehicle is swung back into a horizontal position, the tail gate being caused to swing into closed position, striking at its lower edge upon the cross beam or member 15 in the bottom of the body, the rollers 20 on the pivot pin at this time resting in the depressions 22 of the brackets 18, and when the lower edge of the tail gate strikes the cross member 15, the inertia or force of the impact will dislodge the rollers 20 on the pivot pin from the depressions 22 and these rollers will then descend the inclined slots 19, as shown in Fig. 3, causing the lower edge of the tail gate to descend into a position behind the ledges 12 of the catches, thereby locking the tail gate in closed position, as shown in Fig. 2.

The present invention provides a tail gate which is especially adapted for use upon dumping cars of the kind employed in mining and handling coal, it being relatively simple and inexpensive in construction and automatic in its operation, avoiding the necessity of manipulating the same by hand which experience has shown is difficult and subject to frequent failure.

I claim as my invention:—

1. The combination of a dumping body, a tail gate pivotally mounted thereon, means for holding the lower portion of the gate in closed position, and means operative by the rearward pressure of the load against the gate for automatically unfastening the lower portion of the gate when the body is tilted into dumping position.

2. The combination of a dumping body, a tail gate pivotally mounted thereon, means for holding the lower portion of the gate in closed position, and means operative by the rearward pressure of the load against the gate for automatically lifting the gate to release it from said holding means when the body is tilted into dumping position.

3. The combination of a dumping body, a tail gate pivotally mounted thereon, means for holding the lower portion of the gate in closed position, and means operative by the pressure of material against the gate in the body as the latter is tilted into dumping position for releasing the gate from said holding means.

4. The combination of a dumping body, a tail gate, means for holding the lower portion of the gate in closed position, and means operative by pressure of the load rearwardly against the gate to produce rearward tilting of the gate to lift the same to release it from said holding means and to pivotally support the gate.

5. The combination of a body, a tail gate, a catch to hold the lower portion of the gate in closed position, members having upwardly and outwardly inclined slots, and pivot means on the gate to operate in said slots to lift the gate and thereby release it from said catch when the upper portion of the gate is tilted outwardly.

6. The combination of a body, a tail gate, a catch having an upwardly projecting ledge to hold the lower edge of the gate in closed position, a pivot pin at the upper portion of the gate, and a pair of brackets on the body having upwardly and outwardly inclined slots in which the ends of the pivot pin operate whereby outward pressure of material in the body lifts the gate clear of said ledge on the catch.

7. The combination of a body, a tail gate, a pair of catches secured to the body and having oppositely sloping surfaces presented to the lower edge of the tail gate and also having upwardly projecting ledges to retain the gate in closed position, and means operative automatically to lift the lower edge of the gate clear of the ledges of the catches and thereby release the gate.

In testimony whereof I have hereunto set my hand in presence of two subscribing witnesses.

CHARLES W. STICKLER.

Witnesses:
Chas. S. Hyer,
C. A. Bateman.

Copies of this patent may be obtained for five cents each, by addressing the "Commissioner of Patents, Washington, D. C."